J. A. WHITCOMB.
MILK BOTTLE.
APPLICATION FILED SEPT. 19, 1911.
1,127,141. Patented Feb. 2, 1915.
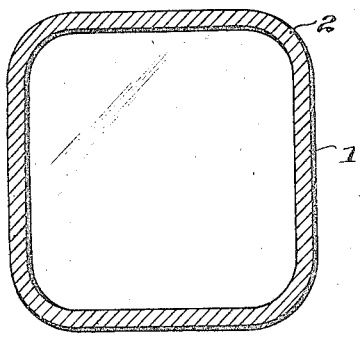
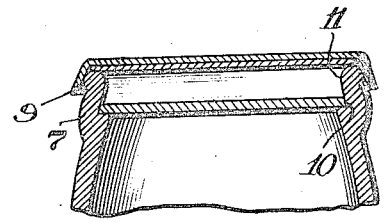
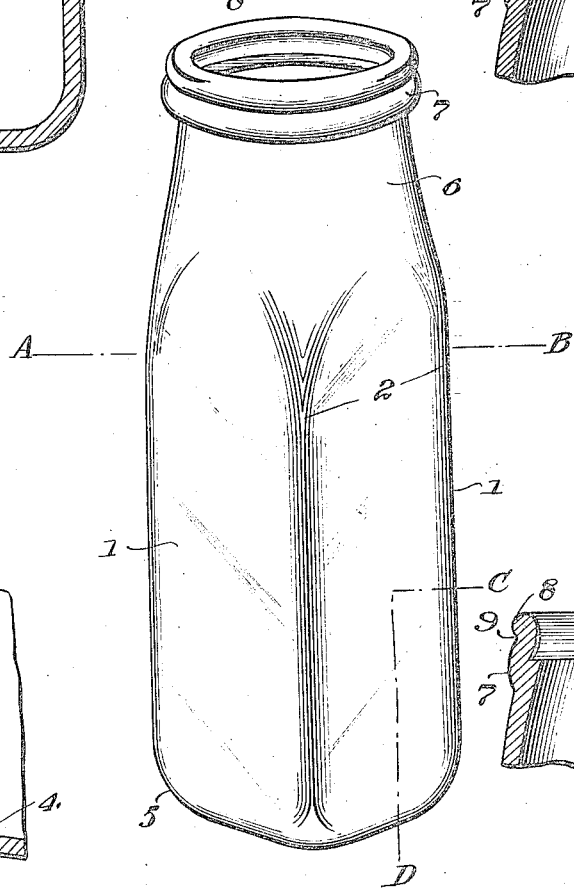
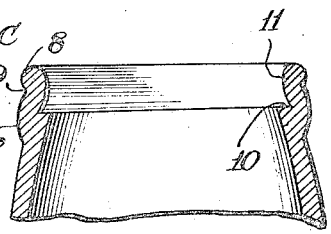
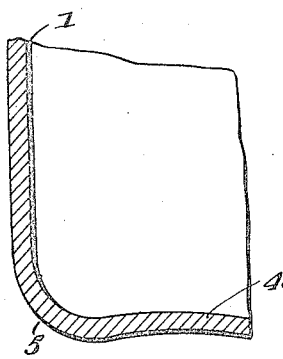
Inventor
James A. Whitcomb
By Geo. W. Ramsey
Attorneys
Witnesses
J. Adolph Bishop
C. S. Butler

UNITED STATES PATENT OFFICE.

JAMES A. WHITCOMB, OF McALESTER, OKLAHOMA.

MILK-BOTTLE.

1,127,141.  Specification of Letters Patent.  Patented Feb. 2, 1915.

Application filed September 19, 1911. Serial No. 650,279.

*To all whom it may concern:*

Be it known that I, JAMES A. WHITCOMB, a citizen of the United States, and a resident of the city of McAlester, in the county of Pittsburg, State of Oklahoma, have invented certain new and useful Improvements in Milk-Bottles, of which the following is a specification.

This invention relates broadly to bottles and jars, and more particularly to a bottle specifically designed for the reception and transportation of milk.

The principal object of this invention is to construct a milk bottle with an interior and exterior beaded mouth in such manner as to receive an inside stopping disk or an exterior closing cap.

Another object of this invention is to construct a milk bottle having flat sides joined by well rounded corners in such manner as to provide bottles which may be closely packed and at the same time be easily cleaned.

A further object of this invention is to construct a milk bottle having flattened sides, said sides and bottoms being joined together in such manner that all adjoining walls are connected by cylindrical curved walls so as to provide no sharp corners which will be difficult to cleanse.

A still further object of this invention is to construct a milk bottle having a substantially squared body portion to which is joined a conical neck portion terminating in a cylindrical mouth.

Other and further objects of this invention will in part be obvious and will in part be pointed out in the specification hereinafter following by reference to the accompanying drawings in which like characters are used to designate like parts throughout the several figures thereof.

Figure 1 is a view illustrating my improved milk bottle. Fig. 2 is a sectional view taken on lines A—B of Fig. 1. Fig. 3 is a detail sectional view of one corner of the milk bottle taken on lines C—D of Fig. 1. Fig. 4 is a sectional detail view of the mouth piece of my improved milk bottle showing the relationship of the interior and exterior beading. Fig. 5 is a detail view showing the manner in which different types of sealing devices coöperate with the beads formed upon my improved milk bottle.

In the milk jars which have hereinbefore been commonly used as containers for transporting milk, the body portion of the jars are formed cylindrical and at their lower portion the bottom joins the cylindrical side walls in an abrupt manner forming a crevice which is difficult to cleanse. They are also formed with a considerable angle between the body portion and the mouth portion. This angle has a tendency to cause eddies in pouring out the milk and also has a tendency to mix or intermingle the cream with the milk which ofttimes is an undesirable thing, particularly where it is desired to separate the cream from the milk.

Referring more particularly to the drawings and more specifically to Fig. 1, it will be noted that the milk jar which is the subject matter of my invention herein described, comprises a jar or bottle formed with substantially flat sides 1 which are joined together by means of cylindrical curved corners 2 in such manner as to form a well rounded interior surface which is easily cleansed and which does not present any sharp curves for the reception of undesirable matter. The bottom 4 is joined to the side walls 1 and to the curved corners 2 by curved edge portions 5. The neck of the jar 6 is formed of a surface which is substantially coincident with a surface that would be formed by projecting a cone downwardly upon a squared member. The upper end of this frustrum of a cone forming the neck is surmounted by a neck bead 7. Referring more particularly to Fig. 1, it will be noted that the cylindrical curved corners 2 meet the neck at a considerably greater distance from the neck bead 7, than do the side portions at their middle line. A second or terminal bead 8 is formed immediately above the neck bead 7 and an exterior holding groove 9 is formed between the terminal bead 8 and the neck bead 7 in such manner as to provide a means to attach an exterior sealing cap. The interior of the bottle mouth is provided with an interior holding groove 10, which is intended as a means for receiving and retaining an ordinary sealing disk which is commonly used for sealing milk jars.

Referring more particularly to Fig. 5, it will be noted that both interior and exterior caps may be simultaneously used upon my improved jar. Of course, it likewise follows that either of the sealing devices shown may be used singly to seal the jar.

Upon more particularly referring to Figs. 4 and 5, it will be noted that the exterior holding groove 9 is arranged a slight distance above the interior holding groove 10. It will be noted that this construction permits the interior holding groove 10 to be formed within the part of material comprising the terminal bead 7, whereas the exterior holding groove 9 is formed within the interior face 11 of the terminal beading, thus securing a considerably greater degree of strength than would be possible if the exterior holding groove 9 and the interior holding groove 10 were formed concentric.

Having thus described my invention what I desire to claim is:—

A milk jar, comprising a receptacle having substantially flat walls, said walls being joined at the corners by cylindrical curved portions, a bottom wall, said bottom wall being joined to the side walls by cylindrical curved portions of substantially the same curvature as the portions joining the side walls together, said parts specified providing a body portion bounded by relatively flat surfaces that are joined at all points by smooth curves of relatively large radii, a conical neck portion joining the side walls in relatively long curves, said curves being longest where said neck portion joins the cylindrical portions forming the corners, and a circular mouth upon said neck portion, said circular mouth having an exterior diameter substantially equivalent to the exterior measurement taken through said side walls and substantially at right angles thereto, in the manner set forth.

JAMES A. WHITCOMB.

Witnesses:
M. A. FLANAGAN,
C. A. BURKE.